US010621232B2

(12) United States Patent
Lahmer et al.

(10) Patent No.: US 10,621,232 B2
(45) Date of Patent: Apr. 14, 2020

(54) IMPORTING DATA TO A SEMANTIC GRAPH

(71) Applicant: SAP SE, Walldorf (DE)

(72) Inventors: Christian Lahmer, Heidelberg-Rohrbach (DE); Stefan Scheidl, Speyer (DE); Michael Neumann, Speyer (DE)

(73) Assignee: SAP SE, Walldorf (DE)

( * ) Notice: Subject to any disclaimer, the term of this patent is extended or adjusted under 35 U.S.C. 154(b) by 454 days.

(21) Appl. No.: 14/644,805

(22) Filed: Mar. 11, 2015

(65) Prior Publication Data

US 2016/0267198 A1    Sep. 15, 2016

(51) Int. Cl.
*G06F 16/00* (2019.01)
*G06F 16/901* (2019.01)

(52) U.S. Cl.
CPC ................ *G06F 16/9024* (2019.01)

(58) Field of Classification Search
CPC ............... H04L 63/1433; G06F 17/30; G06F 17/30091; G06F 16/924; G06Q 30/0251
See application file for complete search history.

(56) References Cited

U.S. PATENT DOCUMENTS

| | | | |
|---|---|---|---|
| 8,438,119 B2 | 5/2013 | Puteick et al. | |
| 8,549,520 B2 | 10/2013 | Stoitsev et al. | |
| 8,924,269 B2 | 12/2014 | Seubert et al. | |
| 8,935,230 B2 | 1/2015 | Heidasch et al. | |
| 8,954,360 B2 | 2/2015 | Heidasch et al. | |
| 2009/0119281 A1* | 5/2009 | Wang | G06F 17/30705 |
| 2009/0312033 A1* | 12/2009 | Shen | H04W 4/08 455/456.1 |
| 2010/0023482 A1* | 1/2010 | Mershon | G06F 16/748 707/E17.014 |
| 2010/0241634 A1* | 9/2010 | Madhok | G06Q 10/107 707/748 |
| 2012/0271719 A1* | 10/2012 | Straley | G06Q 30/02 705/14.66 |
| 2013/0073387 A1* | 3/2013 | Heath | G06Q 50/01 705/14.53 |
| 2013/0262361 A1* | 10/2013 | Arroyo | G06N 5/02 706/46 |
| 2014/0006150 A1* | 1/2014 | Thompson | G06Q 30/0251 705/14.53 |
| 2014/0095453 A1* | 4/2014 | An | G06F 11/1435 707/687 |
| 2014/0114949 A1* | 4/2014 | McClung | G06F 16/367 707/711 |
| 2014/0149405 A1* | 5/2014 | Dawson | G06F 16/2457 707/736 |
| 2014/0149451 A1* | 5/2014 | Duong | G06F 16/41 707/769 |

(Continued)

*Primary Examiner* — Usmaan Saeed
*Assistant Examiner* — David M Nafziger
(74) *Attorney, Agent, or Firm* — Fish & Richardson P.C.

(57) ABSTRACT

The present disclosure describes methods, systems, and computer program products for importing data to a semantic graph. One computer-implemented method includes collecting, at a client, data from an information source; receiving, from a server, a query for information associated with the semantic graph; and sending, in response to the query, the collected data to the server in accordance to a communication protocol, wherein the collected data is imported to the semantic graph.

20 Claims, 3 Drawing Sheets

(56) References Cited

U.S. PATENT DOCUMENTS

| | | | |
|---|---|---|---|
| 2014/0379761 A1* | 12/2014 | Adamson | G06F 16/254 707/811 |
| 2015/0066939 A1* | 3/2015 | Misra | G06F 16/355 707/739 |
| 2015/0156075 A1* | 6/2015 | Gist | G06Q 10/06 709/201 |
| 2015/0220971 A1* | 8/2015 | Raj | G06Q 30/0244 705/14.43 |
| 2016/0132572 A1* | 5/2016 | Chang | G06F 16/258 707/723 |
| 2016/0314701 A1* | 10/2016 | Kim | G09B 19/04 |
| 2016/0357833 A1* | 12/2016 | Ephrat | G06F 19/325 |
| 2017/0046407 A1* | 2/2017 | Palmert | G06Q 10/063114 |

\* cited by examiner

IMPORTING DATA TO A SEMANTIC GRAPH

BACKGROUND

A semantic graph is a network that represents semantic relations between nodes. In some cases, the semantic graph can also be referred to as a semantic network. The semantic graph can be used as a form of knowledge representation. For example, the semantic graph can be used when knowledge that can be represented as a set of concepts that are related to one another. In some implementations, the semantic graph can include vertices and edges. The vertices, e.g., the nodes of the semantic graph, can represent concepts, and the edges can represent associations of the concepts. A semantic graph can be directed or undirected.

SUMMARY

The present disclosure relates to computer-implemented methods, computer-readable media, and computer systems for importing data to a semantic graph. One computer-implemented method for importing data to a semantic graph includes collecting, at a client, data from an information source; receiving, from a server, a query for information associated with the semantic graph; and sending, in response to the query, the collected data to the server in accordance to a communication protocol, wherein the collected data is imported to the semantic graph.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the collected data is used to update the semantic graph.

A second aspect, combinable with any of the previous aspects, wherein updating the semantic graph includes processing the collected data using a term frequency inverse document frequency (TFIDF) calculation.

A third aspect, combinable with any of the previous aspects, wherein the query is received periodically.

A fourth aspect, combinable with any of the previous aspects, wherein the data is collected in response to at least one of a trigger event or a changed date of the information source.

A fifth aspect, combinable with any of the previous aspects, wherein the communication protocol is used to transmit data associated with structured sources and unstructured resources.

A sixth aspect, combinable with any of the previous aspects, wherein the information source is an unstructured source, and wherein collecting the data further includes analyzing data in the unstructured source using a text analysis tool; receiving at least one filtering term; and filtering the analyzed data based on the at least one filtering term.

A seventh aspect, combinable with any of the previous aspects, wherein the information source is a structured source, and wherein collecting the updated data further includes receiving a configuration of the structured source, wherein the configuration includes a location of the data in the structured source; and collecting the data using the configuration of the structured source.

The subject matter described in this specification can be implemented in particular implementations so as to realize one or more of the following advantages. First, the data importing approach described in this specification can reduce the complexity involved in the data importing process. Therefore, the data importing process can be expedited and real time updates from both structured and unstructured information sources can be provided. Second, by using a client server architecture, the data collection function can be localized at the client. Therefore, the server can use a simplified structure to handle data from different types of information sources. Third, data collected from the information sources can be refined based on customized configurations specific to the information sources or the semantic graphs. Fourth, by using queries from the server to request data, the server can control the information flow into the server and, therefore, reduce security risks. Other advantages will be apparent to those of ordinary skill in the art.

The details of one or more implementations of the subject matter of this specification are set forth in the accompanying drawings and the description below. Other features, aspects, and advantages of the subject matter will be apparent from the description, the drawings, and/or the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations but is to be accorded the widest scope consistent with the principles and features disclosed herein.

A semantic graph can be populated by importing data from information sources. An information source can be a structured source or an unstructured source. Examples of a structured source can include an information source that has pre-defined data models, or is organized in a pre-defined manner. For example, a structured source can be a database table including rows and columns. An unstructured source can include an information source that does not have pre-defined formats. Examples of an unstructured source can include a text-heavy document. For example, an unstructured source can be a newspaper article, an academic paper, or a product specification document.

In some cases, manual conversions of the information source can be used to import data to a semantic graph. For example, the Comma Separated Values (CSV) import can be used to import data from a table. In the CSV import, the content of the table can be exported into a .csv file. The .csv file can be restructured and then imported into a graph. In some cases, an Extensible Markup Language (XML)-based file format, e.g., GRAPHML, can be used instead of the .csv file during the manual conversion. In these or other cases, the manual conversion procedures can be time consuming and, therefore, may not be able to import data in real time. It may also be difficult to refine the imported data during the manual conversion procedure. Furthermore, in some cases, the manual conversion techniques can include different procedures for handling unstructured sources as compared to structured sources and, therefore, can increase the complexity of the data importing process.

In some implementations, a Content Provider Service (CPS) system can be used to import data into a semantic graph. Instead of simply copying the data from the information source into a different file format, the CPS system can be configured to retrieve data relevant to the semantic graph from the information source and import the retrieved data accordingly. The CPS system can be used to import initial data to the semantic graph, or import updated data to update the semantic graph. In some cases, the CPS system can be implemented in a client-server architecture. The CPS client can collect data from different types of information sources and provide the collected data to the CPS server. The CPS server can receive the data from the CPS client and import the data into the semantic graph. In some cases, the CPS server can send a query to the CPS client to request data associated with the semantic graph. The CPS client can transmit the data to the CPS server using a communication protocol that is common to the unstructured and structured sources. Therefore, while the CPS client can be configured differently based on the type and content of the information source, the CPS server can use a unified structure to process and import the data from different sources.

In some cases, the data can be refined at the CPS client, CPS server, or a combination thereof. For example, the CPS client can be configured to collect data relevant to the semantic graph by using filter terms or pre-defined configurations. Alternatively or additionally, the CPS server can perform post processing of the data before importing to the semantic graph.

Figure 1:
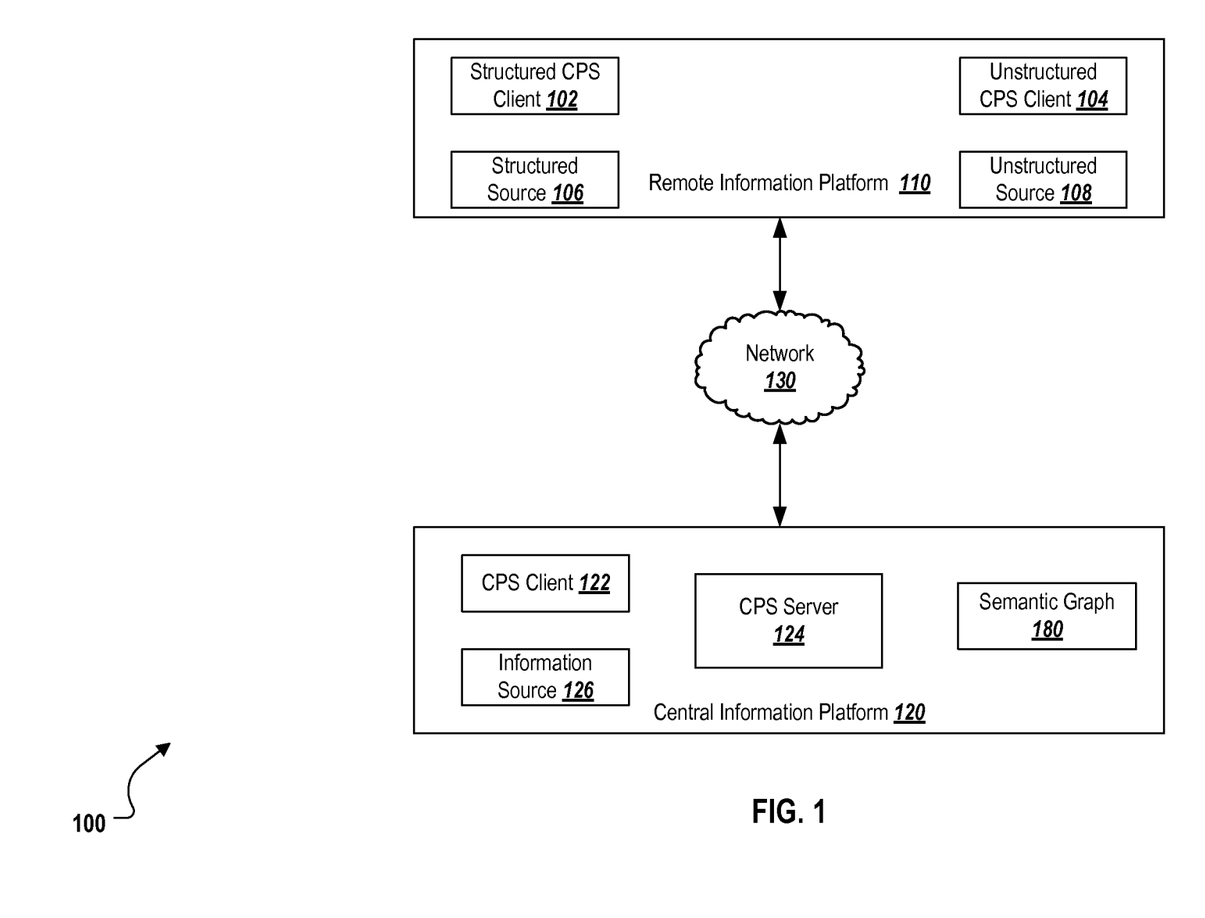
FIG. 1 is a high-level architecture block diagram of a Content Provider Service (CPS) system according to an implementation.

FIG. 1 is a high-level architecture block diagram of a CPS system 100 according to an implementation. At a high level, the illustrated system 100 includes a remote information platform 110 that is communicably coupled with a central information platform 120 through a network 130. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The central information platform 120 represents an application, set of applications, software, software modules, hardware, or combination thereof that can be used to manage the semantic graph. Examples of the central information platform 120 can include a HANA machine. As illustrated, the central information platform 120 can include a CPS server 124, a semantic graph 180, a CPS client 122, and an information source 126.

Figure 3:
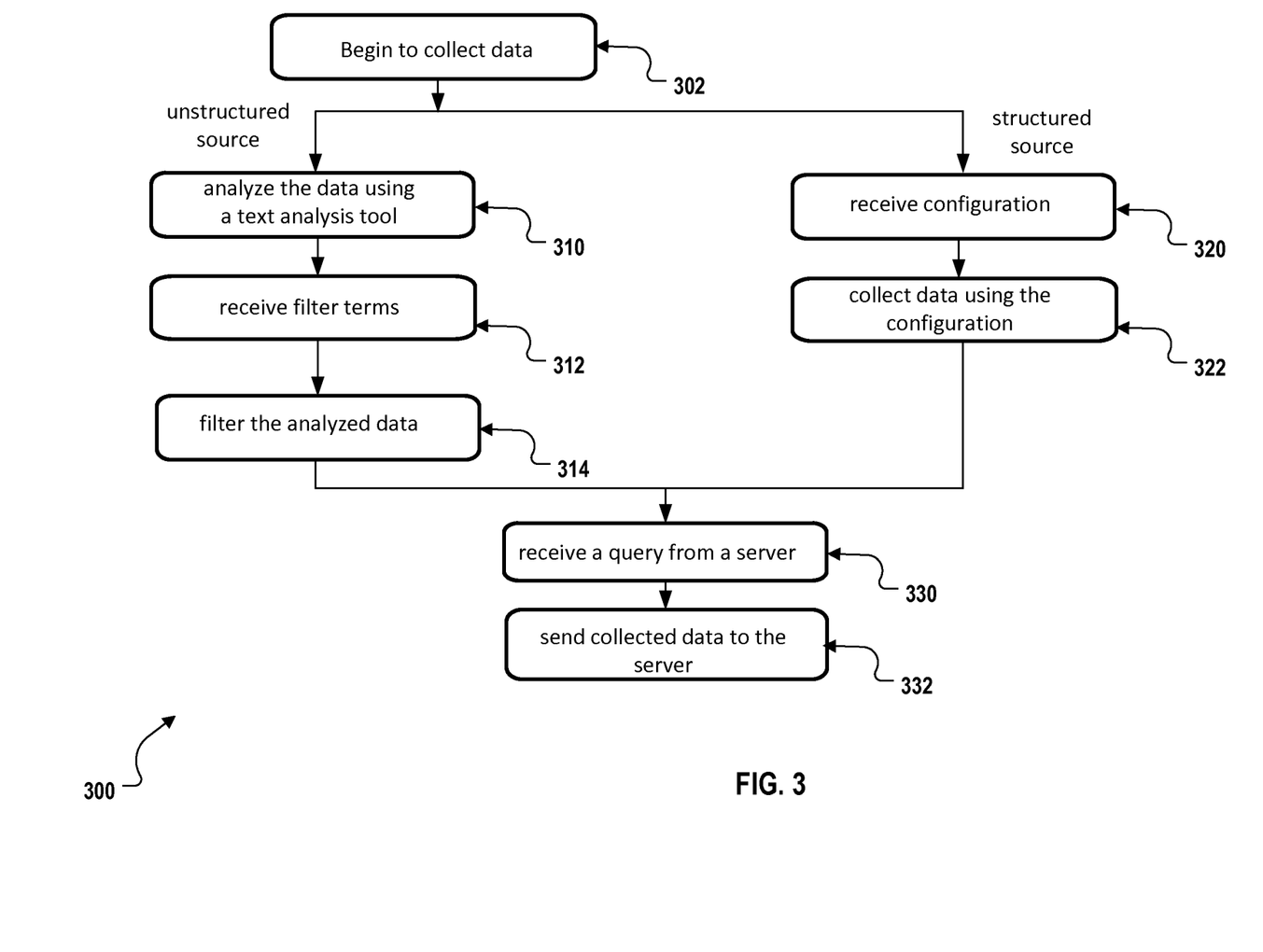
FIG. 3 is a flow diagram of a method illustrating a process for importing data to a semantic graph according to an implementation.

As illustrated, the central information platform 120 includes a CPS server 124. The CPS server 124 represents an application, set of applications, software, software modules, hardware, or combination thereof that can be used to receive data associated with the semantic graph 180 and import data to the semantic graph 180. In some implementations, the CPS server 124 can also provide data refinement operations on the received data. The CPS server 124 can also send query to a CPS client to request data associated with the semantic graph 180. FIG. 3 and associated descriptions provide additional details of these implementations.

As illustrated, the central information platform 120 includes a semantic graph 180. The semantic graph 180 represents a semantic graph that can be populated by the information source in the CPS system 100. In some implementations, as illustrated, the semantic graph 180 can be stored on the same platform as the CPS server. Alternatively, the semantic graph 180 can be stored in a device that is outside of the central information platform 120.

As illustrated, the central information platform 120 includes an information source 126. The information source 126 represents any data files that include data relevant to the semantic graph 180. The information source 126 can be structured or unstructured. The information source 126 can be created or updated independent of the semantic graph 180.

As illustrated, the central information platform 120 includes a CPS client 122. The CPS client 122 represents an application, set of applications, software, software modules, hardware, or combination thereof that can be used to collect data from the information source 126. The CPS client 122 can be configured to collect data from an unstructured source or a structured source. In some implementations, the CPS client 122 can be configured to collect data in response to a changed data of the information source 126, a trigger event, or a combination thereof. In some implementations, the CPS client 122 can be configured to refine the data collection based on configurations specific to the information source 126, the semantic graph 180, or a combination thereof. In some cases, the CPS client 122 can transmit the collected data to the CPS server 124 according to a communication protocol that is common for structured or unstructured sources. FIG. 3 and associated descriptions provide additional details of these implementations.

In some cases, the information source can be located at the same platform as the CPS server. In some cases, the information source can be located at a platform that is different than the CPS server. For example, as illustrated, the CPS system 100 includes the remote information platform 110 that is separate from the central information platform 120. The remote information platform 110 includes a structured source 106, an unstructured source 108, a structured CPS client 102, and an unstructured CPS client 104. The structured source 106 represents any structured information source that includes data relevant to the semantic graph 180. For example, as discussed previously, the structured source 106 can be a table with pre-defined rows and columns. The unstructured source 108 represents any unstructured information source that includes data relevant to the semantic graph 180. For example, as discussed previously, the unstructured source 108 can be an article. The structured CPS client 102 represents an application, set of applications, software, software modules, hardware, or combination thereof that can be used to collect data from a structured source, e.g., the structured source 106. The unstructured CPS client 104 represents an application, set of applications, software, software modules, hardware, or combination thereof that can be used to collect data from an unstructured source, e.g., the unstructured source 108. In some implementations, the structured CPS client 102 and the unstructured CPS client 104 can use the same communication protocol to transmit data to the CPS server 124. In some implementations, the data can be transmitted to the CPS server 124 over the network 130 over a Hypertext Transfer Protocol (HTTP) or a Hypertext Transfer Protocol Secure (HTTPS) connection. FIG. 3 and associated descriptions provide additional details of these implementations.

The network 130 facilitates communications between the components of the system 100 (e.g., between the remote information platform 110 and the central information platform 120). In some implementations, the network 130 can be a wireless or a wireline network. In some implementations, the network 130 can also be a memory pipe, a hardware connection, or any internal or external communication paths between the components.

While portions of the software elements illustrated in FIG. 1 are shown as individual modules that implement the various features and functionality through various objects, methods, or other processes, the software can instead include a number of sub-modules, third-party services, components, libraries, and the like, as appropriate. Conversely, the features and functionality of various components can be combined into single components as appropriate.

Figure 2:
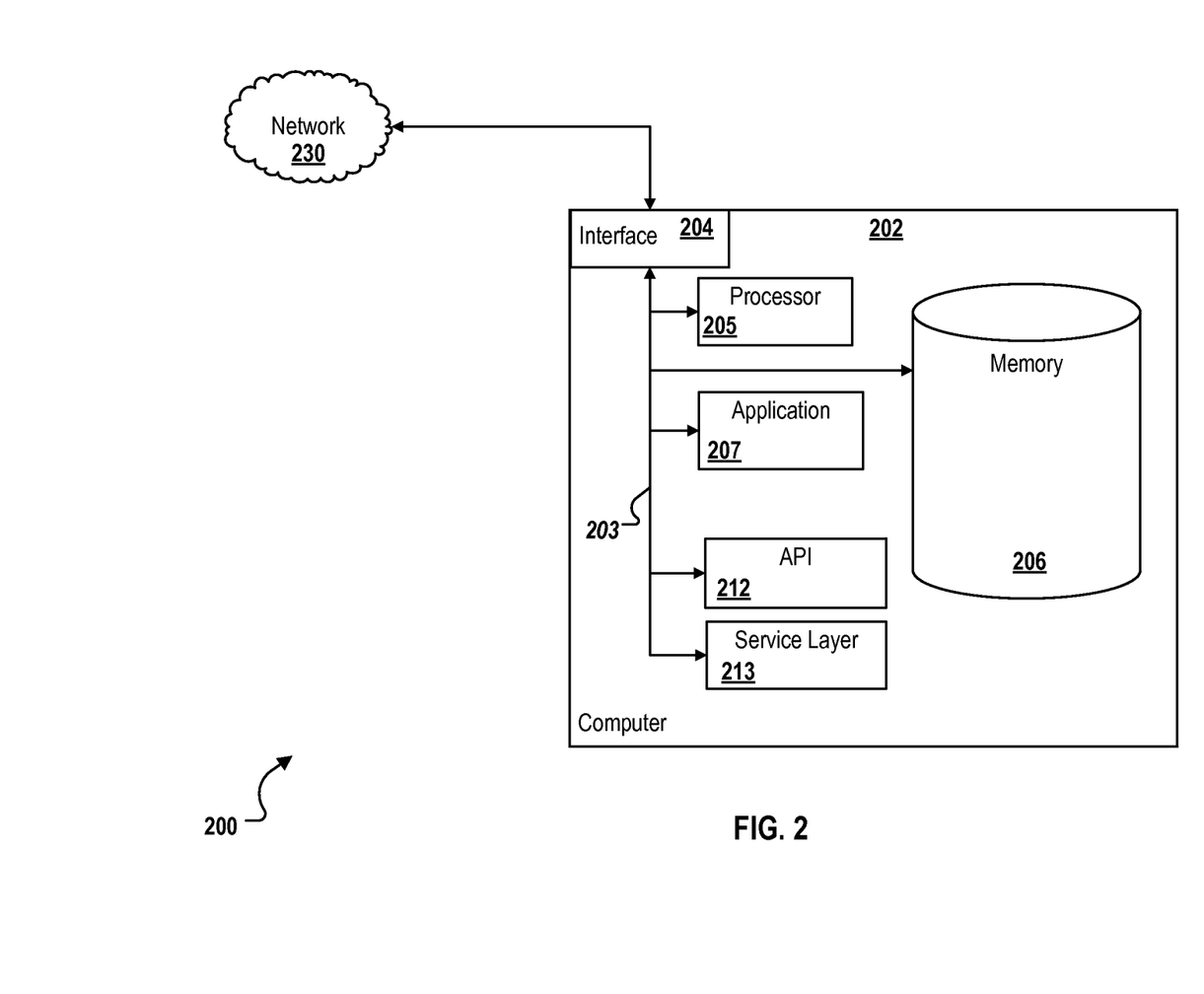
FIG. 2 is a block diagram of an exemplary computer used in a CPS system according to an implementation.

FIG. 2 is a block diagram 200 of an exemplary computer used in a CPS system according to an implementation. The illustrated computer 202 is intended to encompass any computing device such as a server, desktop computer, laptop/notebook computer, wireless data port, smart phone, personal data assistant (PDA), tablet computing device, one or more processors within these devices, and/or any other suitable processing device, including both physical and/or virtual instances of the computing device. Additionally, the computer 202 may comprise a computer that includes an input device, such as a keypad, keyboard, touch screen, microphone, speech recognition device, other device that can accept user information, and/or an output device that conveys information associated with the operation of the computer 202, including digital data, visual and/or audio information, or a GUI.

The computer 202 can serve as a client, network component, a server, a database or other persistency, and/or any other component of the system 100. The illustrated computer 202 is communicably coupled with a network 230. In some implementations, one or more components of the computer 202 may be configured to operate within a cloud-computing-based environment.

At a high level, the computer 202 is an electronic computing device operable to receive, transmit, process, store, or manage data and information associated with the system 100. According to some implementations, the computer 202 may also include or be communicably coupled with an application server, e-mail server, web server, caching server, streaming data server, business intelligence (BI) server, and/or other server.

The computer 202 can receive requests over network 230 from a client application (e.g., executing on another computer 202) and respond to the received requests by processing the said requests in an appropriate software application. In addition, requests may also be sent to the computer 202 from internal users (e.g., from a command console or by another appropriate access method), external or third parties, other automated applications, as well as any other appropriate entities, individuals, systems, or computers.

Each of the components of the computer 202 can communicate using a system bus 203. In some implementations, any and/or all the components of the computer 202, both hardware and/or software, may interface with each other and/or the interface 204 over the system bus 203 using an application programming interface (API) 212 and/or a service layer 213. The API 212 may include specifications for routines, data structures, and object classes. The API 212 may be either computer language-independent or -dependent and refer to a complete interface, a single function, or even a set of APIs. The service layer 213 provides software services to the computer 202 and/or the system 100. The functionality of the computer 202 may be accessible for all service consumers using this service layer. Software services, such as those provided by the service layer 213, provide reusable, defined business functionalities through a defined interface. For example, the interface may be software written in JAVA, C++, or other suitable language providing data in Extensible Markup Language (XML) format or other suitable format. While illustrated as an integrated component of the computer 202, alternative implementations may illustrate the API 212 and/or the service layer 213 as stand-alone components in relation to other components of the computer 202 and/or system 100. Moreover, any or all parts of the API 212 and/or the service layer 213 may be implemented as child or sub-modules of another software module, enterprise application, or hardware module without departing from the scope of this disclosure.

The computer 202 includes an interface 204. Although illustrated as a single interface 204 in FIG. 2, two or more interfaces 204 may be used according to particular needs, desires, or particular implementations of the computer 202 and/or system 100. The interface 204 is used by the computer 202 for communicating with other systems in a distributed environment—including within the system 100—connected to the network 230 (whether illustrated or not). Generally, the interface 204 comprises logic encoded in software and/or hardware in a suitable combination and operable to communicate with the network 230. More specifically, the interface 204 may comprise software supporting one or more communication protocols associated with communications such that the network 230 or interface's hardware is operable to communicate physical signals within and outside of the illustrated system 100.

The computer 202 includes a processor 205. Although illustrated as a single processor 205 in FIG. 2, two or more processors may be used according to particular needs, desires, or particular implementations of the computer 202 and/or the system 100. Generally, the processor 205 executes instructions and manipulates data to perform the operations of the computer 202. Specifically, the processor 205 executes the functionality required for a CPS system.

The computer 202 also includes a memory 206 that holds data for the computer 202 and/or other components of the system 100. Although illustrated as a single memory 206 in FIG. 2, two or more memories may be used according to particular needs, desires, or particular implementations of the computer 202 and/or the system 100. While memory 206 is illustrated as an integral component of the computer 202, in alternative implementations, memory 206 can be external to the computer 202 and/or the system 100.

The application 207 is an algorithmic software engine providing functionality according to particular needs, desires, or particular implementations of the computer 202 and/or the system 100, particularly with respect to functionality required for a CPS system. For example, application 207 can serve as one or more components/applications described in FIGS. 1-3. Further, although illustrated as a single application 207, the application 207 may be implemented as multiple applications 207 on the computer 202. In addition, although illustrated as integral to the computer 202, in alternative implementations, the application 207 can be external to the computer 202 and/or the system 100.

There may be any number of computers 202 associated with, or external to, the system 100 and communicating over network 230. Further, the terms "client," "user," and other appropriate terminology may be used interchangeably as appropriate without departing from the scope of this disclosure. Moreover, this disclosure contemplates that many users may use one computer 202, or that one user may use multiple computers 202.

FIG. 3 is a flow diagram of a method 300 illustrating a process for importing data to a semantic graph according to an implementation. For clarity of presentation, the description that follows generally describes method 300 in the context of FIGS. 1-2. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order.

At 302, the CPS client can begin to collect data from an information source. In some cases, the data are collected to import initial information to a semantic graph. In some cases, the data are collected to update the semantic graph. In some implementations, the CPS client can begin to collect data based on a trigger event. The trigger event can be configured by a system administrator. In some cases, the trigger event can be a change of the information source. For example, the CPS client can begin to collect data when the information source is created or modified. In some cases, the trigger event can be based on an indication from the server. For example, the server can send a query to trigger the collection of data. In some cases, the CPS client can begin to collect data based on a changed date of the information source. For example, the CPS client can determine when the information source was last updated and begin to collect data if the information source is updated within a predetermined period. As described previously, the information source can be structured, unstructured, or a combination thereof.

In some cases, the CPS client can begin the collection by determining the type of the information. If the information source or, in some cases, a portion of the information source is unstructured, method 300 proceeds from 302 to 310. At 310, the data in the information source can be analyzed. In some cases, the data is analyzed by using a text analysis tool. Examples of the text analysis tool includes HANA Text Analysis tool and AVERBIS Text Mining tool. In some implementations, the text analysis tool can select relevant data in the unstructured information source. The relevant data can be related to persons, nouns, or predetermined terms. The predetermined terms can be defined by dictionaries, or text analysis tool-specific rules, e.g., CUSTOM GROUPER USER LANGUAGE-Rules (CGUL-Rules). In some cases, the predetermined terms can be selected according to the field of the information source. For example, if the information source is a document related to medical science, a text analysis tool can use CGUL-Rules to find data that are related to International Statistical Classification of Diseases and Related Health Problems (ICD)-10 codes in the document. From 310, method 300 proceeds to 312.

At 312, filter terms can be received. In some cases, the filter terms can be configured by a system administrator. This approach can enable the system administer configure the filter terms that are relevant to the semantic graph, and therefore, control the information flow into the CPS server. For example, if the semantic graph collects knowledge related to cancer research, the system administrator can configure a set of filter terms that represent specific types of cancer diseases. The filter terms can be configured through an interface of the CPS client, or remotely from other locations in the CPS system. The CPS client can receive these filter terms locally, from the CPS server, or from other locations in the CPS system. From 312, method 300 proceeds to 314.

At 314, the analyzed data that are received at 310 can be filtered. In some cases, the CPS client can use the filter terms received at 312 to filter the analyzed data and retrieve data that are relevant to the semantic graph. From 314, method 300 proceeds to 330.

If the information source or, in some cases, a portion of the information source is structured, method 300 proceeds from 302 to 320. At 320, a configuration of the information source can be received. For example, if the data in the information source is stored in a table, a configuration of the information source can indicate the information types of one or more columns in the table. In one example, the configuration can indicate that column 1 of the table is an identifier of a patient, column 2 is the name of the patient, column 3 is the symptoms of the patient, and column 4 is the diagnosis of the patient. In some cases, the configuration can be set by a system administrator. This approach can enable the system administer to set the configurations that are relevant to the semantic graph, and therefore, control the information flow into the CPS server. For example, if the semantic graph is related to medical research and the column 3 and 4 represent symptoms and diagnosed diseases, respectively, the configuration can be set to include the information types of the column 3 and 4 but omit the information types of other columns.

The configuration can be set through an interface of the CPS client, or remotely from other locations in the CPS system. The CPS client can receive the configuration locally, from the CPS server, or from other locations in the CPS system. From 320, method 300 proceeds to 322.

At 322, data from the information source can be collected using the configuration received at 320. For example, if the configuration indicates that one or more columns are related to the associations of nodes in the semantic graph, the CPS client can collect data from these columns based on the configuration. From 322, method 300 proceeds to 330.

At 330, a query can be received from the CPS server. In some cases, the CPS server can send the query for data associated with the semantic graph. As discussed above related to 302, in some cases, the CPS client can collect the data before a query is received. Alternatively or in combination, the query can trigger the collection of the data. In some cases, the CPS server can send the query periodically, e.g., every 20 seconds, for data associated with the semantic graph. From 330, method 300 proceeds to 332.

At 332, the collected data is sent to the CPS server in response to the query at 330. In some implementations, the data is transmitted in accordance with a communication protocol between the CPS server and the CPS client. In some cases, the same communication protocol can be used to transmit data of an unstructured source and a structured source. This approach can reduce the complexity of the CPS server because the CPS server can have a unified interface in receiving and processing data from different types of information sources. In some cases, the communication protocol can be formatted based on a JAVASCRIPT Object Notation (JSON) protocol. In some cases, e.g., when the CPS server and the CPS client are located on different nodes in the CPS system, the collected data can be transmitted over a Hypertext Transfer Protocol (HTTP) or a Hypertext Transfer Protocol Secure (HTTPS) connection.

In some cases, the CPS server can import the data into the semantic graph. In some cases, the importing functions performed by the CPS server can include inserting, updating, deleting, or a combination thereof. In some cases, each node or association in the graph that is updated can be mapped to a graph type. The graph type can be an entity type or an association type.

In some cases, the CPS server can process the received data to determine how to import the data into the semantic graph. For example, the CPS server can perform a term frequency inverse document frequency (TFIDF) calculation to process the received data. The TFIDF calculation can determine the importance of data based on the frequency of the data, and rank the data. In some cases, the ranking information determined during the TFIDF calculation can be stored in an element of the graph, e.g., a node or an association of the graph.

In some cases, the CPS server can follow one or more configuration rules of the semantic graph in updating the semantic graph. For example, the one or more configuration rules can include duplication rules, sequence dependency rules, data consistency rules. Under a duplication rule, the CPS server can remove duplicate information while updating the graph. Under a sequence dependency rule, the CPS server can update the graph based on a predetermined sequence. The predetermined sequence can include an order for a group of nodes or associations. Under a data consistency rule, the CPS server can refrain from deleting a node until all edges associated with the node have been deleted. In some cases, a system administrator can configure one or more configurations rules. For example, the system administer can configure the CPS server not to delete a node or an edge that is created through a user interface.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media, and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user, and a keyboard and a pointing device, e.g., a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in Extensible Markup Language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products. Furthermore, while the operations depicted in the drawings may indicate start and/or end points for the operations, implementations of the methods described in the disclosure are not restricted to the particular start and/or end point as illustrated. Other implementations may start and/or end at different points of the operations.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method for importing data to a semantic graph, comprising:
    collecting, at a client device, data from an information source, wherein the data is relevant to the semantic graph, wherein collecting the data comprises:
        determining, by at least one hardware processor at the client device, whether the information source is an unstructured source or a structured source;
        configuring, at the client device, filter terms for determining first data relevant to the semantic graph from the unstructured source, wherein the first data is to be imported into the semantic graph, and wherein the filter terms are related to a specific field type of the semantic graph;
        setting up a configuration for determining second data relevant to the semantic graph from the structured source, wherein the configuration includes one or more data types from a plurality of data types from the structured source, wherein the one or more data types are associated with the second data, and wherein the one or more data types are relevant to the specific field type of the semantic graph; and
        collecting, by the at least one hardware processor at the client device, the data from the information source based on the determining, wherein collecting the data comprises:
            in response to determining that the information source is the unstructured source, collecting, by the at least one hardware processor at the client device, the first data by using a text analysis tool, wherein the text analysis tool collects the first data based on filtering according to the filter terms to retrieve the first data relevant to the specific field type of the semantic graph; or
            in response to determining that the information source is the structured source, collecting, by at least one hardware processor at the client device, the second data based on the configuration set up for determining the second data at the structured source;
    receiving, at the client device and from a server over a network, a query for data associated with the semantic graph, wherein the client device and the server are different devices; and
    sending, in response to the query, the collected data from the client device to the server over the network in accordance to a first communication protocol, wherein client device uses the first communication protocol to transmit the first data collected from the unstructured source to the server and to transmit the second data collected from the structured source to the server, and the collected data is imported to the semantic graph by the server.

2. The method of claim 1, wherein the collected data is used to update the semantic graph.

3. The method of claim 2, wherein updating the semantic graph comprises processing the collected data using a term frequency inverse document frequency (TFIDF) calculation.

4. The method of claim 1, wherein the query is received periodically.

5. The method of claim 1, wherein the data is collected in response to at least one of a trigger event or a changed date of the information source.

6. The method of claim 1, wherein the information source is the unstructured source, and wherein collecting the first data comprises:
    analyzing data in the unstructured source using the text analysis tool;
    receiving at least one filtering term from the filter terms; and
    filtering the analyzed data based on the at least one filtering term.

7. The method of claim 1, wherein the information source is the structured source, and wherein collecting the second data comprises:
    receiving the configuration for the structured source, wherein the configuration includes a location of the data in the structured source.

8. The method of claim 1, further comprising:
    defining, at the server, one or more configuration rules for maintaining data at the semantic graph; and
    updating the data at the semantic graph according to the one or more configuration rules.

9. The method of claim 8, wherein the one or more configuration rules include at least one a duplication rule, a sequence dependency rule, and a data consistency rule.

10. A client device, comprising:
    a memory; and
    at least one hardware processor interoperably coupled with the memory and configured to:
    collect, at a client device, data from an information source, wherein the data is relevant to the semantic graph, wherein collecting the data comprises:
        determine, by at least one hardware processor at the client device, whether the information source is an unstructured source or a structured source;
        configure, at the client device, filter terms for determining first data relevant to the semantic graph from the unstructured source, wherein the first data is to be imported into the semantic graph, and wherein the filter terms are related to a specific field type of the semantic graph;
        set up a configuration for determining second data relevant to the semantic graph from the structured source, wherein the configuration includes one or more data types from a plurality of data types from the structured source, wherein the one or more data types are associated with the second data, and wherein the one or more data types are relevant to the specific field type of the semantic graph; and collect, by the at least one hardware processor at the client device, the data from the information source based on the determining, wherein collecting the data comprises:

in response to determining that the information source is the unstructured source, collect, by the at least one hardware processor at the client device, the first data by using a text analysis tool, wherein the text analysis tool collects the first data based on filtering according to the filter terms to retrieve the first data relevant to the specific field type of the semantic graph; or in response to determining that the information source is the structured source, collect, by at least one hardware processor at the client device, the second data based on the configuration set up for determining the second data at the structured source;

receive, at the client device and from a server over a network, a query for data associated with the semantic graph, wherein the client device and the server are different devices; and send, in response to the query, the collected data from the client device to the server over the network in accordance to a first communication protocol, wherein client device uses the first communication protocol to transmit the first data collected from the unstructured source to the server and to transmit the second data collected from the structured source to the server, and the collected data is imported to the semantic graph by the server.

11. The client device of claim 10, wherein the collected data is used to update the semantic graph.

12. The client device of claim 11, wherein updating the semantic graph comprises processing the collected data using a term frequency inverse document frequency (TFIDF) calculation.

13. The client device of claim 10, wherein the query is received periodically.

14. The client device of claim 10, wherein the data is collected in response to at least one of a trigger event or a changed date of the information source.

15. The client device of claim 10, wherein the information source is the unstructured source, and wherein collecting the first data comprises:

analyzing data in the unstructured source using the text analysis tool;
receiving at least one filtering term from the filter terms; and
filtering the analyzed data based on the at least one filtering term.

16. The client device of claim 10, wherein the information source is the structured source, and wherein collecting the second data comprises:

receiving the configuration for the structured source, wherein the configuration includes a location of the data in the structured source.

17. A non-transitory, computer-readable medium storing computer-readable instructions for simplifying user interactions in a computer-aided transaction process, the instructions executable by a computer and configured to:

collecting, at a client device, data from an information source, wherein the data is relevant to the semantic graph, wherein collecting the data comprises:

determining, by at least one hardware processor at the client device, whether the information source is an unstructured source or a structured source;

configuring, at the client device, filter terms for determining first data relevant to the semantic graph from the unstructured source, wherein the first data is to be imported into the semantic graph, and wherein the filter terms are related to a specific field type of the semantic graph;

setting up a configuration for determining second data relevant to the semantic graph from the structured source, wherein the configuration includes one or more data types from a plurality of data types from the structured source, wherein the one or more data types are associated with the second data, and wherein the one or more data types are relevant to the specific field type of the semantic graph; and collecting, by the at least one hardware processor at the client device, the data from the information source based on the determining, wherein collecting the data comprises:

in response to determining that the information source is the unstructured source, collecting, by the at least one hardware processor at the client device, the first data by using a text analysis tool, wherein the text analysis tool collects the first data based on filtering according to the filter terms to retrieve the first data relevant to the specific field type of the semantic graph; or in response to determining that the information source is the structured source, collecting, by at least one hardware processor at the client device, the second data based on the configuration set up for determining the second data at the structured source;

receiving, at the client device and from a server over a network, a query for data associated with the semantic graph, wherein the client device and the server are different devices; and sending, in response to the query, the collected data from the client device to the server over the network in accordance to a first communication protocol, wherein client device uses the first communication protocol to transmit the first data collected from the unstructured source to the server and to transmit the second data collected from the structured source to the server, and the collected data is imported to the semantic graph by the server.

18. The non-transitory, computer-readable medium of claim 17, wherein the collected data is used to update the semantic graph.

19. The non-transitory, computer-readable medium of claim 17, wherein the information source is the unstructured source, and wherein collecting the first data comprises:

analyzing data in the unstructured source using the text analysis tool;
receiving at least one filtering term from the filter terms; and
filtering the analyzed data based on the at least one filtering term.

20. The non-transitory, computer-readable medium of claim 17, wherein the information source is the structured source, and wherein collecting the second data comprises:

receiving the configuration for the structured source, wherein the configuration includes a location of the data in the structured source.

\* \* \* \* \*